United States Patent [19]

Girgis et al.

[11] Patent Number: 4,762,751
[45] Date of Patent: Aug. 9, 1988

[54] FLEXIBLE, CHEMICALLY TREATED BUNDLES OF FIBERS, WOVEN AND NONWOVEN FABRICS AND COATED BUNDLES AND FABRICS THEREOF

[75] Inventors: Mikhail M. Girgis, Pittsburgh; Ernest L. Lawton, Allison Park, both of Pa.

[73] Assignee: PPG Industries, Inc., Pittsburgh, Pa.

[21] Appl. No.: 866,017

[22] Filed: May 22, 1986

Related U.S. Application Data

[63] Continuation-in-part of Ser. No. 635,864, Jul. 30, 1984, abandoned.

[51] Int. Cl.⁴ .............................................. D02G 3/00
[52] U.S. Cl. ...................................... 428/378; 428/266; 428/268; 428/273; 428/375; 428/391; 428/392; 428/394; 428/395; 65/3.41; 65/3.43; 65/3.44
[58] Field of Search .............. 428/392, 375, 378, 394, 428/391, 395; 65/3.41, 3.44, 3.43

[56] References Cited

U.S. PATENT DOCUMENTS

| | | | |
|---|---|---|---|
| 2,893,892 | 7/1959 | Pinte et al. | 427/407.3 |
| 3,189,578 | 6/1965 | Kuemmerer | 260/77.5 |
| 3,298,854 | 1/1967 | Marzocchi et al. | 427/407.3 |
| 3,318,757 | 5/1967 | Atwell | 65/3.41 |
| 3,364,059 | 1/1968 | Marzocchi | 428/378 |
| 3,427,192 | 2/1969 | Bolinger | 117/139.5 |
| 3,432,332 | 3/1969 | Marzocchi et al. | 427/407.3 |
| 3,616,185 | 10/1971 | Goldberg | 161/185 |
| 3,627,714 | 12/1971 | Merki | 117/139.5 |
| 3,653,957 | 4/1972 | Schafer et al. | 428/397 |
| 3,684,470 | 8/1972 | Marzocchi | 65/3.44 |
| 3,773,546 | 11/1973 | Marzocchi | 428/381 |
| 3,814,592 | 6/1974 | McWilliams et al. | 65/3 |
| 3,837,892 | 9/1974 | Marzocchi | 117/62.1 |
| 3,862,882 | 1/1975 | Marzocchi | 428/378 |
| 3,869,308 | 3/1975 | Graham | 65/3 |
| 3,875,118 | 4/1975 | Meisert et al. | 260/75 |
| 3,924,028 | 12/1975 | Benson et al. | 427/175 |
| 4,031,288 | 6/1977 | Bhakuni et al. | 428/394 |
| 4,034,138 | 7/1977 | Babayan | 428/378 |
| 4,066,591 | 1/1978 | Scriven et al. | 428/425 |
| 4,143,091 | 3/1979 | Chang et al. | 428/425 |
| 4,187,347 | 2/1980 | Brook | 428/375 |
| 4,264,655 | 4/1981 | Brook | 427/381 |
| 4,271,229 | 6/1981 | Temple | 428/288 |
| 4,272,294 | 6/1981 | Jaunarajs | 106/99 |
| 4,276,044 | 6/1981 | Dieterich | 528/71 |
| 4,358,502 | 11/1982 | Dunbar | 65/3.44 |
| 4,374,177 | 2/1983 | Hsu et al. | 428/392 |
| 4,390,647 | 6/1983 | Girgis | 65/3.44 |
| 4,394,475 | 7/1983 | Temple et al. | 428/378 |
| 4,405,746 | 9/1983 | Girgis | 428/378 |
| 4,450,197 | 5/1984 | Hager et al. | 428/232 |
| 4,663,231 | 5/1987 | Girgis et al. | 428/375 |

OTHER PUBLICATIONS

Witcobond W-234 Product Bulletin, p. 1, No. 342, by Witco Chemical Corporation, Organics Division, Feb., 1981.

(List continued on next page.)

Primary Examiner—Sharon A. Gibson
Attorney, Agent, or Firm—Kenneth J. Stachel

[57] ABSTRACT

More flexible bundles of high modulus, low elongation fibers are provided by the impregnated bundles of the present invention. The flexible bundle of fibers comprise a plurality of fibers having a first treatment of a moisture-reduced residue of an aqueous chemical composition and a second treatment of a moisture-reduced, partially-cured impregnant of an aqueous chemical coating composition. The individual fibers in the impregnated bundle were first treated with an aqueous sizing composition having at least a fiber protectorant and optionally an antistatic agent and/or coupling agent. The impregnating composition has one or more elastomeric curable polyurethanes that are water soluble, emulsifiable or dispersible and one or more cross-linking materials that are water soluble, emulsifiable or dispersible and water. Optionally, there may be present one or more emulsifiable or dispersible lubricants, plasticizers, polymeric materials, and flame retardants. The flexible impregnated bundles of glass fibers are useful in reinforcing polymers and fiber optic and drop-wire cables and in producing woven and nonwoven fabrics where the fabrics can be coated with polymeric films.

50 Claims, 2 Drawing Sheets

OTHER PUBLICATIONS

"An Investigation of the Effect of Coatings on the Failure Mechanism of Fiber Glass Yarn in Tubular Reverse Osmosis Supports" by National Technical Information Service, pp. 5–8, 25–29, 32–37 47 and 52–53.

"High Performance Coated Fabrics of Kevlar ® Aramid Fiber", Journal of Coated Fabrics, vol. 7, Jul., 1977, pp. 3–23.

"Architectural PTFE–Coated Glass Fabrics–Their Structure and Limitations", M. P. Answell et al., School of Materials Science, University of Bath, Claverton Down, Bath, England, Textile Research Journal 11/83.

"Utilization of Vinyl Coated Synthetic Fabrics in Industrial Applications", Richard N. Seaman, Balakrishnan Venkataraman, Journal of Coated Fabrics, vol. 5, Apr., 1976, p. 230.

FLEXIBLE, CHEMICALLY TREATED BUNDLES OF FIBERS, WOVEN AND NONWOVEN FABRICS AND COATED BUNDLES AND FABRICS THEREOF

This application is a continuation-in-part of Ser. No. 635,864, filed July 30, 1984 abandoned.

The present invention is directed to chemically treated bundles of fibers such as strands and yarns, which can be fabricated into myriad products including: bundle reinforced polymeric products, braided fabrics and fabrics which can be coated or laminated with polymeric films.

Glass fibers, which were originally developed in the 1930's, have been applied over the years as fibers, strands and yarns in numerous end uses such as textiles and reinforcement for polymeric matrices and rubber goods. Glass fibers are traditionally produced through attenuation from small orifices in a bushing of a glass batch melting furnace. The glass fibers issue forth from the orifices in molten streams and are cooled and treated with a sizing composition. The sizing composition is ordinarily an aqueous composition having components like coupling agents, lubricants and film forming polymers. The sized glass fibers are gathered into one or more bundles of fibers or strands and wound into a forming package or chopped. For textile applications, the bundles of fibers in the forming packages can be twisted or false twisted or combined with other strands and twisted or false twisted to form yarns. In producing fabrics from the yarns, the yarns which will constitute the film yarns are usually further treated with a slashing sizing composition so that they can undergo the rigors of weaving. Fabrics having the warp and weft yarns usually are heat-cleaned to remove both the forming and slashing sizing compositions. When the glass fiber strands from the forming packages are used for reinforcement of rubber goods, a second chemical treatment or coating is usually applied to the strands to make the strands or bundles of strands or cords compatible with the rubber matrix. This second coating is known in the industry as an RFL dip coating, where the term "RFL" means resorcinol formaldehyde latex coating and where the latex material includes a diene-containing elastomer to participate in the vulcanization of the rubber matrix.

Some of the outstanding properties of glass fibers that have fostered their growth in these numerous commercial applications include: relative nonflammability, heat and chemical resistances, excellent tensile and excellent dimensional stability. These advantageous characteristics of glass fibers have not been fully utilized in numerous textile fabrics because other fibers such as polyesters and nylons have much better flex fatigue characteristics than the glass fibers. Many textile fabrics could utilize the advantageous characteristics of glass fibers, if the glass fibers were more flexible and had a better flex fatigue characteristic like polyester and nylon textiles. A few examples include woven or knitted fabrics and nonwoven scrim and chemically coated textile fabrics useful in wall coverings, carpet backings, filter fabrics, tarpaulins, pond liners or pond covers, awnings, sail cloth, electrical sleevings and harnesses and the like.

For instance, textile fabrics of polyesters and polyamides such as nylon, aramide fibers like Kevlar ® fibers, rayon and other organic and even some inorganic man made fibers like griege glass fiber fabric, have been coated with polymers such as polyvinyl chloride, polyurethanes, silicones, polytetrafluoroethylene, neoprene and synthetic rubbers, to produce coated fabrics. These have found wide application in the industrial and commercial, architectural and building industries and for sundry geotextile applications. The performance requirements of the textile fabric in the polymeric coated textile fabric include: high tensile strength, good flexibility, good weatherability, good chemical resistance, good flexibility in various climates, high tear strength and resistance to tear propagation, good dimensional stability to minimize stretch underload, good stability under various temperature and humidity conditions, good abrasion and good adhesion to the polymeric film coating. These performance requirements are applicable to coated fabrics used in large applications such as air and tension structures like air supported covers over athletic stadiums and airport facilities to smaller applications such as awnings and tarpaulins. For instance, in the air and/or tension structures, the air supported covers can be huge, ranging from 26,000 square meters for an atheltic stadium to 425,000 square meters for an airport facility. Two desirable properties in this application and the other applications are good flame resistance and dimensional stability. These are two of the excellent properties of glass fibers but the lack of the requisite flexibility, abrasion resistance and adhesion to the polymeric film coating have limited the use of glass fibers in coated textile fabrics.

Another technology area that would benefit from the availability of more flexible bundles of glass fibers is the communications industry. Telephone wires connecting customers to the service currently utilize copper-plated steel, stainless steel wire or cable reinforcement. The telephone service cable has copper-plated steel wire as reinforcement, and the rapidly developing fiber optic cable utilizes the Kevlar strand and steel wire reinforcement. Dealing with the specter of the inflexibility and vulnerability to abrasion of glass fiber strands would enable glass fiber strands to donate to the aforedescribed uses the properties of good corrosion resistance, non-flammability, and high breaking strength.

It is an object to the present invention to provide coated bundles of fibers having a high modulus and low elongation with improved flexibility and abrasion resistance to result in improved coated yarns, and woven and nonwoven fabrics, which can be manufactured into numerous woven and nonwoven fabrics and reinforced polymeric materials taking advantage of the nonflammability and dimensional stability provided by the fibers.

It is an additional object of the invention to provide bundles of fibers having a high modulus and low elongation with good flexibility and flexural fatigue properties, where the fabrics prepared from the bundles need not be heat cleaned to remove various chemical sizing compositions applied to the fibers.

SUMMARY OF THE INVENTION

Accordingly, the aforementioned objects and other objects gleaned from the following disclosure are accomplished by the bundles of fibers impregnated with the moisture reduced, at least partially-cured residue of an aqueous chemical coating and impregnating composition (hereinafter referred to as the impregnating coating composition). The fibers can be any fiber having modulus of elongation of at least $7 \times 10^6$ psi and an elongation at break of less than 5% and where the fibers are sensitive to interfilament abrasion. The bundles of fibers have a plurality of fibers, where each fiber has a first chemical treatment and the bundle of chemically treated fibers has a second chemical treatment the moisture-reduced, at least partially-cured residue of the aqueous chemical coating and impregnating composition.

The first chemical treatment is present on a substantial portion of the surfaces of each fiber as a moisture-reduced residue of an aqueous chemical treating composition. This aqueous chemical treating composition, referred to as a sizing composition, can have a fiber protectorant such as a film forming polymer and/or lubricant, and, if the hydrophilic character of the fibers would limit compatibility with polymers, a hydrophilicity reducing agent such as a coupling agent can be present. The type of protectorant and the absence of interfering components enables the fibers in the form of a bundle to separate one from another when confronted with a disturbing force. The disturbing force can be mechanical contact, gaseous contact, hydrodynamic force or any other frictional contact to disturb the fibers one from the other to allow for fiber separation. The amount of the moisture-reduced residue of the sizing composition that is present is in the range of about 0.05 to about 5 weight percent of the treated fiber.

The one or more bundles of gathered sized fibers have a moisture-reduced, at least partially-cured impregnating coating residue having a film hardness in the range of Shore values from A-10 to D-80 and a film elongation in the range of about 100 to about 800 percent. The residue results from an aqueous impregnating coating composition having: an elastomeric polyurethane that is curable up to at least about 10 weight percent and that gives an uncured film having an elongation on the order of 75 to 1000 percent, and crosslinking material and water. The curing is a non-vulcanized cure by a reactive means other than sulfur-crosslinking, where the one or more polyurethanes have a film elongation of less than around 700 percent, a softening agent is present in an effective amount to produce the desired properties for the moisture-reduced, cured residue of the aqueous impregnating coating composition. Furthermore, the aqueous impregnating coating composition has an effective viscosity for impregnating the bundles of fibers, and the amount of moisture-reduced impregnant coating on the bundles is greater than around 5 weight percent of the bundle although the exact amount depends upon the filament diameter of the fibers in the bundle. The water in the impregnating coating composition is present in a predominant amount so that the total solids and viscosity of the impregnating coating composition are effective for impregnating the bundle of fibers. The impregnation is to such a degree so that the moisture-reduced, and at least partially-cured residue of the aqueous impregnating composition is present as a coating on a substantial portion of a majority of the filaments in the bundle so that a majority of the filaments are separated to some extent from each other by the moisture-reduced, at least partially-cured impregnating coating. The crosslinkable material is present in the coating composition in an amount that is effective to engender at least the partial cure of the elastomeric, curable polyurethane polymer to assure that the polyurethane polymer is not redispersible in water.

Optionally, included in the aqueous impregnating composition for the fibers are fiber lubricants, silane coupling agents, pigments, dyes, fire retardants and the like. The use of the lubricant is especially useful when the impregnated bundle of fibers is to be braided or woven, and not coated as a reinforcing bundle or as a fabric with a polymeric coating.

The fibers can be produced by methods well known to those skilled in the art. For example, glass fibers are produced from small orifices in a bushing of a glass batch melting furnace from any fiberizable glass composition, where the filaments are properly treated with an aqueous sizing composition. The aqueous sizing composition is applied to protect the filaments from interfilament abrasion and damage, and, if necessary, to render the surface of the glass fibers less hydrophilic to be more compatible with hydrophobic coatings. A plurality of sized glass fibers are gathered into one or more bundles, strands, and collected into a package. One or more bundles of sized glass fibers are removed from one or more packages and treated with the aqueous impregnating coating composition in such a manner that the sized glass fibers within the bundle separate one from another to a degree to allow the impregnation of the bundle by the aqueous coating composition with the effective viscosity and total solids. The impregnated bundle of glass fibers is dried to at least partially cure the impregnant to produce impregnated bundles of glass fibers having sufficient flexibility for use as reinforcement or for production of fabrics. The coated and impregnated bundles can subsequently reinforce various rubbery and non-rubbery polymers. The fabric subsequently can be coated to produce coated fabrics by processes such as impregnation or saturation and other surface coating processes like solvent-containing coatings, plastisols and lamination with preformed films or sheets of coating polymeric materials. When the aqueous impregnating composition has a lubricant to provide the bundles of glass fibers with an effective amount of lubricity, the impregnated bundles of glass fibers can be braided into various fabrics.

DETAILED DESCRIPTION OF THE INVENTION

Figure 1:
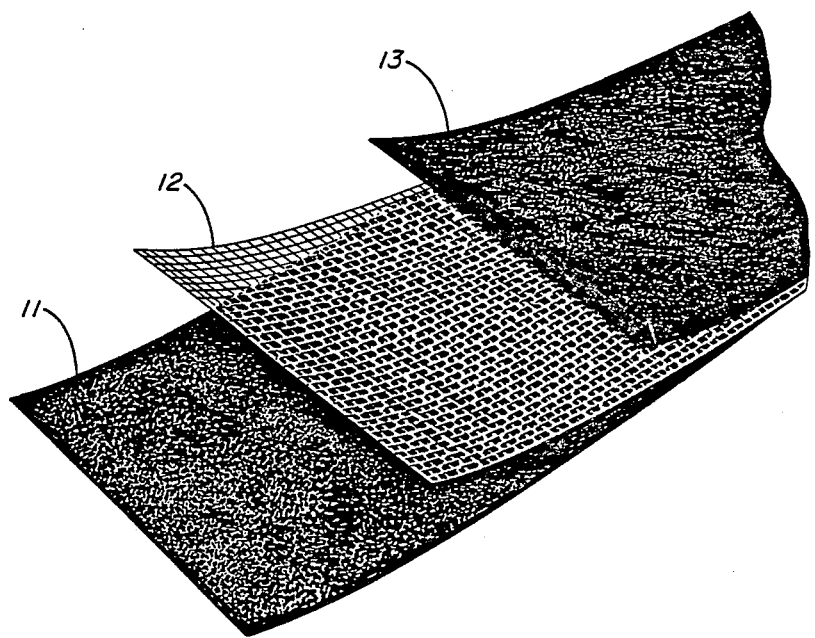
FIG. 1 depicts the coated fabric showing the laminated sheets or films used in conjunction with the fabric of the impregnated bundles of fibers.

When the high modulus, low elongation fibers are glass fibers, they can be produced from any fiberizable glass batch composition and prepared into glass fibers such as "E-glass fibers", "621-glass fibers", "A-glass fibers", "S-glass fibers", "C-glass fibers", and low fluorine and/or boron derivatives thereof. The glass fibers issue forth from orifices in a bushing of the glass batch melting furnace and, when they have cooled sufficiently, the aqueous sizing composition is applied to them. The glass fibers can be mechanically attenuated or prepared by any other method known to those skilled in the art. The aqueous sizing composition can be applied to the glass fibers by any method known to those skilled in the art such as belts, rollers, sprays, and the like. The aqueous sizing composition has present a hydrophilic reducing agent such as a coupling agent to make the fibers less hydrophilic and a protectorant, where the protectorant can be a glass fiber lubricant or a glass fiber film forming polymer. The film forming polymer forms a film upon the evaporation of a carrier, or upon drying or actually forms a liquid film. Also for glass fibers and other types of fibers, additional ingredients like friction-reducing agents and/or antistatic agents may be present. Any coupling agent, glass fiber lubricant or glass fiber film forming polymer known to those skilled in the art can be used. It is preferred that the sized glass fibers do not have present or are essentially free of a starch film forming material or any other material that would provide too much cohesion between the fibers. A nonexclusive example of a suitable nonstarch containing aqueous sizing composition for glass fibers is that disclosed in U.S. Pat. No. 4,390,647 (Girgis), which is hereby incorporated by reference. The sized glass fibers are gathered into bundles or strands of glass fibers, where the bundles can comprise generally from 200 to over 3,000 filaments. The bundles of fibers or strands are collected usually by winding onto a forming package or into a precision wound package of roving.

The sized glass fibers usually have about 0.05 to about 5 weight percent of the sized glass fibers strands as the sizing composition, which has reduced moisture by the evaporation of water either by air drying or by drying at elevated temperatures. Although the sized glass fibers can also be in a wet condition when treated with the aqueous impregnating composition.

In the aqueous sizing composition applied to the glass fibers, the coupling agents employed can be any coupling agent known to those skilled in the art such as silane coupling agents, a few examples of which are gamma aminopropyltrimethoxy silane, methacryloxypropyltrimethoxy-silane, glycidoxypropyltrimethoxy silane, and the like, and metal halide complex coupling agent like methacrylato chromic chloride complex. Such agents are described in U.S. Pat. No. 2,611,718. Other Werner type coupling agents having vinyl, alkyl, amino, epoxy, mercaptyl, thioalkyl, thioaryl, and phenyl groups are also suitable for incorporation into the size of the instant invention. Nonexclusive examples of the various silane coupling agents that can be used in the sizing composition of the instant invention include in general hydrolyzable vinyl, alkyl, beta- chloropropyl, phenyl, thio-alkyl, thio alkyl aryl, amino-alkyl, methacrylato, epoxy and mercapto silanes, their hydrolysis products, polymers of the hydrolysis products and mixtures of any of these may be employed. The usual amounts of coupling agents employed in sizing compositions for glass fibers can be used such as an amount of 0.1 to 2 percent by weight based on the aqueous sizing composition can be used.

The fiber protectorants that can be used in the sizing composition of the present invention include any glass fiber lubricant including wet lubricants and nonionic lubricants or dry lubricants such as cationic lubricants like Cation-X, which is an alkyl imidazoline derivative produced as a reaction product of stearic acid, and tetraethylene pentamine stearic acid. Also acid solubilized water, soluble, dispersible stearic amides and anhydrides, acid solubilized water dispersible low molecular weight fatty acid amides, as well as anhydrous acid solubilized and polyunsaturated lower molecular weight fatty acid amides can also be used as the cationic lubricants. Typical hydrogenated vegetable oil lubricants can also be used such as hydrogenated cotton seed oil, hydrogenated corn oil, hydrogenated soy bean oil and the like. An example of the film forming polymeric materials that can be used include the polyoxyalkylene polyols or polyalkylene polyols; gelatin; glucose, cellulosic materials such as carboxymethyl cellulose, hydroxyethyl cellulose, methyl cellulose; oxyethylated stearates; and synthetic resins, such as ureaformaldehyde polymers, melamine-formaldehyde polymers, acetoneformaldehyde polymers, phenol-formaldehyde polymers; alkyd resins such as glyceryl-phthalic anhydride reaction products; polyamides, saturated and unsaturated polyesters, hydrocarbon-siloxane resins, epoxy resins; vinyl resins such as homopolymers and copolymers of ethylene, propylene, styrene, isobutylene, butadiene, acrylonitrile, vinyl chloride, vinyl pyrrolidone, vinylidene chloride, vinyl acetate, vinyl alcohol, acrylic acid and ester thereof, methacrylic acid and esters thereof, and the like. Mixtures of these film formers may also be employed. These film-formers are preferably used in the form of aqueous solutions, dispersions or emulsions. Also known silylated versions of the aforementioned film formers can be used.

The predominant constituent of the solids of the aqueous impregnating coating composition is the polyurethane polymer. By the use of the term polyurethane, it is meant to include reaction products of organic compounds having at least two active hydrogens and di and/or polyisocyanates, wherein the resulting polymer is an elastomeric curable polyurethane or polyurethane urea type polymer. By elastomeric, it is meant that the film of the polyurethane alone, i.e., an uncured film, has a hardness of about 10 Shore A to about 75 to 80 Shore D with a preferred hardness of Shore A 60 to 100 and an elongation on the order of 75 to 1000 percent. The Shore hardness test is conducted on a Shore durometer by standard procedures, and elongation is measured in accordance with ASTM testing procedure, D412. Also by elastomeric, it is meant that the solid polyurethane is capable of being extended to twice its own length at 68° C. and on release of the stress returns with force to approximately its original length all within a reasonable period of time. These materials are noncrystalline in the undeformed state and they have a sufficiently high enough molecular weight to make them elastomeric materials. Also these materials have glass transition temperatures (Tg) of around 0° C. or less. The Tg can be determined by any method known to those skilled in the art; for example, nuclear magnetic resonance peak ratio or by less complicated methods involving more approximation like differential thermal analysis. The elastomeric materials can have limited branching, aromatic content and/or polar functionality as long as the Tg of the material is less than around 0° C. The meaning of essentially predominant constituent means that most of the solids is comprised of the elastomeric polymer, but the amount can be less than a majority of the solids, such as around 40 weight percent or more. Usually when the amount is less than around 50 weight percent solids, there are several other components present. Hence, the total amount of the elastomeric polymer is reduced, but it is still present in an amount of the solids that is greater than any other single component.

Preferably, the organic compounds with at least two active hydrogens is a polyol such as polyester polyol or polyether polyol and most preferably, a polyol which is linear. Examples of polyester-based polyurethane elastomers include those where the polyester is prepared from carboxylic acid such as adipic and the glycol portion can be selected from such materials as ethylene glycol, 1,2-propylene clycol, 1,3-butylene glycol and 1,4-butylene glycol. Further examples of polyfunctional polyesters which can be used are those based on phthalic anhydride, adipic acid, thylene glycol, trimethylol propane, and the like. A slight amount of branching of the polyol can be tolerated but the degree of functionality or branching of the polyol should be kept to a minimum since increased branching results in films that are tougher, harder and less flexible. The di or polyisocyanates generally used to form the polyurethane can be aromatic, aliphatic or mixtures thereof, but the aliphatic isocyanates are preferred. Examples of the polyisocyanates that can be used include the aromatic isocyanate of toluene diisocyanate and the aliphatic isocyanates such as hexamethylene diisocyanate, methylcyclohexylene diisocyanate, dicyclohexyl methane diisocyanate, lysine diisocyanate where the aliphatic group is methyl or ethyl, bis(2-isocyanato ethyl) fumaric, bis(2-isocyanate ethyl) carbonate and dimeryl diisocyanate, where the organic group is essentially a $C_{36}$ hydrocarbon radical. Another isocyanate that may be used is 4,4'-diphenyl methane diisocyanate.

The polyurethane polymer can be made as a curable material by any method known to those skilled in the art that does not involve vulcanization through sulfur cross-linking. For instance, additional monomers like diisocyanate, polyols or epoxies can be added to the polymer and/or a curable moiety can be introduced into the polymer. Nonexclusive examples of the aforementioned reactive groups or curable moieties used to make the curable elastomeric polyurethane are hydroxyls, epoxies, ureas, amines, amides, and olefinic groups, or reactive methylene or olefinic groups. The polyurethane polymers can be produced by any one-shot or single step method known to those skilled in the art or by the two-step chain extension process utilizing linear or lightly branched polyols with the necessary molar portions of a diisocyanate known to those skilled in the art to produce a water dispersible polyurethane. One or more of a mixture of these various elastomeric curable polyurethanes can be used in the aqueous coating composition of the present invention. Particularly, two or more of the polyurethanes can be blended in the aqueous impregnating coating composition to achieve desired hardness and/or elongation properties for the coating on the sized glass fibers. These elastomeric curable polyurethanes are water soluble, emulsifiable or dispersible through the use of dispersing agents and emulsifiers which can have a nonionic, cationic and/or anionic and/or amphoteric or zwitterionic nature. In addition, the polyurethane polymers can be internally emulsified by incorporating one or more dispersing agents or emulsifiers with the other polyurethane producing monomers to produce the polyurethane polymer. The internal emulsifiers and/or dispersants, whether in the backbone of the polymer or pendant from the backbone, may participate in the crosslinking of the polyurethane. The curable polyurethane can have any degree of curability through non-sulfur cross-linking. Preferably, the maximum degree of curability is around 10 percent or less based on the solids of the residue of the aqueous impregnating coating composition or on a dry basis. When polyurethanes with higher degrees of curability are used, they are only partially cured to around a 10 percent maximum.

Nonexclusive examples of the polyurethane polymers that can be used as the film forming polymers in the impregnating coating include those that are internally emulsified, examples of which are shown in U.S. Pat. Nos. 4,143,091; 4,208,494; and 4,208,495, all of which are hereby incorporated by reference. Other types of polyurethane polymers that can be used are those having ionic groups present on the polymer molecule such as those disclosed in U.S. Pat. No. 4,066,591, which is hereby incorporated by reference. Other types of polyurethane ionomers, e.g. polyurethane polymers having ionic groups present on the polymer, that can be used in the composition of the present invention include polyurethane ionomers such as anionomers and cationomers. Nonexclusive examples of the ionomers include anionomers that are produced by reacting organic diisocyanates having molecular weights of from about 160 to about 300 with tri and/or tetra alkylene polyol such as ethylene glycol, and optionally other aliphatic glycols having molecular weights of from about 62 to about 200 in the presence of glycols containing carboxyl, carboxylate, sulfonic acid and/or sulfonate groups and having molecular weights of less than around 500. These polyurethane polymers containing the ionic groups or hydrophilic polyether segments are self-emulsifiable and do not need emulsifiers or high shear forces to be emulsified or dispersed, since they are self-dispersing. Also cationic polyurethanes that are formed by quaternizing polyaddition reactions can be used. Combinations of the ionic polyurethanes with polyester, polyethers, polyacetals, polyisocyanates, low molecular weight glycols and diamines can also be used. The type and amount of the ionic groups present in the ionic polyurethanes are selected so that the polyurethane is not only self-dispersing but that the particle size of the polyurethane is less than around 5 microns. The properties of these polyurethane polymers can vary from hard film properties to flexible film properties. It is those polymers with the flexible film properties that are most useful in the present invention. Generally, the molecular weight of the polyurethane can range from about 10,000 to 40,000 average molecular weight.

Specific examples of commercially available polyurethane polymers that can be used include the aliphatic polyurethane dispersions such as Witcobond W-212 and W-234, available from Witco Chemical Corporation. The Witcobond W-212 material has a milky white appearance with a 30 percent solids level and a density of 8.7 lb/gal. The flash point is greater than 100° C., and the particle charge is cationic and the particle size is 1 micron. The pH at 25° C. (77° F.) is 4.5, and the viscosity at 25° C. (77° F.) in Brookfield LVF (cps) is 50, and the surface tension in dynes/cm is 41. The film properties of this polyurethane are: tensile strength 4,400 psi and ultimate elongation of 400 percent. Another polyurethane used in the present invention is the Witcobond W-234 polyurethane, available from Witco Chemical Corporation. The W-234 polyurethane is hazy in appearance and aliphatic in chemical type. The solids is 30 percent, and the density is 8.8 lb/gal. The flash point is similar to the W-212 material, and the particle charge is anionic, while the dispersion is colloidal. The pH at 25° C. (77° F.) is 8.0, and the viscosity at 25° C. (77° F.) as measured by Brookfield LVF in cps is 100, and the surface tension in dynes/cm is 54. The film properties of this polyurethane are: tensile strength 8,000 psi and ultimate elongation of 270 percent. The preferred polyurethane is the Witcobond W-290H material, which is milky white in appearance, aliphatic in type with a 65 percent solids level and with a particle size of around 5 microns and a pH at 25° C. (77° F.) of 7.5 and a viscosity as measured by Brookfield LVF in cps of 200 and a surface tension of 42 dynes/cm. The film properties of the 290H material, when cured with 6.5 parts of epoxy resin dispersion like Witcobond XW for 100 parts of urethane latex, are: 4,500 psi tensile strength, 720 percent elongation and moduli of 250 psi at 100%, 540 psi at 300% and 1550 psi at 500%.

In a blend with one or the other of the two aforementioned aqueous polyurethane dispersion, another polyurethane like that in the aqueous polyurethane dispersion known as Mobay XW-110 or XW-110 M can be used. The XW-110 and XW-110 M materials are available from Mobay Chemical Company, Pittsburgh, Pa.

The XW-110 material is a hazy, off-white, anionic dispersion of an aliphatic polyester urethane polymer in water and N-methyl-2-pyrrolidone, and its physical properties according to manufacturer are:

| Solids, % weight | 35 |
|---|---|
| Cosolvent type | N—methyl-2-pyrrolidine |
| Cosolvent content, % by weight | 15 |
| Density, pounds/gallon at 25° C. | 8.7 |
| Specific gravity at 25° C. | 1.04 |
| Viscosity, cps at 25° C. | 130 |
| pH | 8.3 |
| Mechanical stability | Excellent |
| Freeze-thaw stability | Pass 5 cycles |
| Elevated temperature storage at 50° C. | Pass 30 days |
| Flash point, Pensky-Martens closed cup | None |

The Mobay XW-110 polyurethane dispersion forms a tough, flexible, and nontacky film. Typical film properties are as follows:

| Tensile strength, psi | 6600 |
|---|---|
| Ultimate Elongation, % | 170 |
| Modulus: | |
| at 100%, psi | 5200 |
| at yield, psi | 5700 |
| Hydrolytic Stability, 7 days at 70° C. and 95% R.H. | Retains film integrity |

The crosslinking material is present to cure the curable polyurethane by a means other than sulfur vulcanization and the crosslinking material may even crosslink with itself. Suitable crosslinking materials include: chemical compounds, monomeric compounds, oligomeric compounds, and polymeric materials. The polymeric crosslinking material can be an external and/or internal crosslinking or curing agents that are reactive for crosslinking at room temperature or, preferably, at elevated temperatures. Nonexclusive examples of suitable crosslinking materials include chemical compounds like: hexakis (methoxymethyl) melamine, lower hydrocarbon epoxides like those containing 2 to 12 carbon atoms including styrene oxide, alpha phenyl propylene oxide, trimethylene oxide, lower alkylene oxides like epoxides containing from 2 to 8 carbon atoms including ethylene oxide, propylene oxide, butylene oxide, isobutylene oxide and the like, and formaldehyde and alkoxysilanes and phenolics. A few nonexclusive examples of oligomeric materials include: aldehyde condensates used in conjunction with acid or basic catalysts, such as melamine formaldehyde, hexakis (methoxymethyl) melamine, phenol formaldehyde and resorcinol formaldehyde including both methylol-containing condensates, monomers, dimers, trimers and higher oligomers. The phenol or resorcinol compounds include cresol and mixtures ot its isomers, xylenol or mixtures of its isomers, a mixture of homologs of phenol and dihydric phenols such as phlorglucinol, cresorcinol, and metaxylorcinol. The aldehyde includes any methylene donor that can be used for the formaldehyde, nonexclusive examples include: paraformaldehyde, hexamethylene-tretramine acid aldehyde and furfural and mixtures thereof.

Nonexclusive examples of polymeric crosslinking materials include: methylol-containing condensates of phenolic compounds, polyhydroxyphenolic compounds like resorcinol, urea, melamine, and the like where the methylol results from any methylene donating compound like formaldehyde in its various forms like paraformaldehyde, hexamethylene-tetramine, acid aldehyde and furfural and mixtures thereof, and also includes aminoplast resins, organic polyisocyanates, and epoxycontaining polymers. Further examples of suitable external and internal crosslinking materials are given in U.S. Pat. No. 4,066,591 (Scriven et al.), assigned to the common assignee of this application and this patent is hereby incorporated herein by reference. One or more melamine formaldehyde resins are useful because of their ease in crosslinking and their compatibility with the polyurethane polymers. A particularly suitable melamine formaldehyde resin is the aqueous melamine formaldehyde resin available from Monsanto Company under the trade designation Resimene 841 which has less than 2 percent free formaldehyde and less than 5 percent methanol and has a boiling point of 210F. The Resimene 841 also has a vapor pressure of 95 for methanol and 17.5 for water, a vapor density of 1.11 for methanol and .64 for water and has a colorless, clear mobile liquid appearance and has a specific gravity at 77° F. of 1.25 and a percent volatility by volume percent of 29. Such a crosslinkable material as the melamine formaldehyde resin may require the use of a crosslinking controlling agent to control the degree of crosslinking between the crosslinkable polymeric material and possibly between the crosslinkable material and the polyurethane polymer. The crosslinking controlling agent can be one which modifies the pH of the coating composition such as ammonium hydroxide or an acid catalyst for the crosslinkable material. A nonexclusive example of the latter is a solution of toluene sulfonic acid in isopropanol such as that available under the trade designation Cycat 4040 with 40 percent acid and 60 percent alcohol available from American Cyanamide Co. The preferred crosslinking material is that available from Witco Chemical Corporation under the trade designation Witcobond TM XW aqueous epoxy emulsion. This epoxy emulsion has an epoxide equivalent weight of 345 to 385, a percent nonvolatiles of 54 to 56 percent, a viscosity in Brookfield at 25° C. (77° F.) poise of 15 to 70 and an appearance which is a milky white liquid, and has a flashpoint of greater than 200° F. (93° C.), has pounds per gallons at 25° C. of 9.1.

The amount of the crosslinking material present in the aqueous impregnating coating composition is that amount to provide effective crosslinking with the polyurethane polymer to cure the curable polyurethane polymer so that the resultant film or residue has a hardness in the range of Shore values from A 10 to about D 80 and preferably from about A 60 to about A 100 and elongation of about 100 to about 800 percent and most preferably, a modulus at 300 percent elongation of about 500 to about 4,000 psi. Generally, the amount of crosslinking agent is around 10 weight percent and most preferably, up to 6 weight percent of the crosslinking agent relative to the polyurethane weight. This amount allows for sufficient crosslinking or curing of the polyurethane. Most preferably, the amount of crosslinking material is less than that amount to effect the total possible crosslinking of the polyurethane polymer, and the amount is only that amount to assure the degree of crosslinking of the polyurethane to prevent the redispersion of the polyurethane in water and save some crosslinkability of the polyurethane for adhesion to a matrix polymer. If a matrix polymer is not to be used with impregnated bundles of fibers, the amount of crosslinking material in the aqueous impregnant can be that amount to totally cure the polyurethane that is only curable to arount 10 weight percent. For self-crosslinkable crosslinking materials, the amount can exceed that for crosslinking the polyurethane, but the amount should not exceed that amount which causes the resultant film of the coating to have a hardness value and an elongation value in excess of the aforementioned values. Amount greater than that for crosslinking the polyurethane will not increase any further the crosslink density, but it will provide a blend of properties.

The water in the aqueous impregnating and coating composition constitutes a predominant amount of the composition including both volatile and nonvolatile portions. The amount of water results in a total solide conentration and viscosity for the composition that enables the composition to impregnate the bundle of filaments including bundles of strands and yarn. The degree of impregnation of the bundle of filaments is such that a majority of the filaments have a substantial portion of their surfaces covered with a near continuous film of the residue of the aqueous coating composition so that a majority of the filaments are separated from each other. It is not necesary that the bundle is encapsulated, although it may be as long as it is also impregnated. Preferably, when the polyurethane polymer is preemulsified or dispersed for addition to the aqueous coating composition to a solids content of around 50 percent or less, the viscosity of the aqueous coating composition is around 5 or less for a kiss-roll type coating application and up to around 15±5 centipoise at room temperature for a die coating process. The dip pick-up of the aqueous coating composition varies depending upon the diameter of the filaments in the bundle. The variation is that the finer diameter filaments require a higher total dip pick-up in the aqueous chemical treating composition, since the surface area of the finer diameter filaments is higher.

If the polyurethane or blend of polyurethanes in the impregnating coating would not result in sufficient flexibility of the cured coating residue, a softening agent is employed in the aqueous impregnating coating composition. The softening agent comprises one or more aqueous dispersible or emulsifiable or soluble plasticizers. The aqueous dispersible or emulsifiable plasticizers would be used with suitable nonionic, cationic, anionic, amphoteric or zwitterionic emulsifiers or dispersing agents having HLB values which are in the same ranges as the HLB value of the plasticizer. When one or more plasticers are used in the aqueoue impregnating coating composition, the type of polyurethane polymer that can be used can have higher hardness values since the plasticizers reduce the hardness value of the film of the coating composition on the bundle of filaments. Suitable examples of plasticizers that can be used include butyl benzyl phthalate available under the trade designation Sanitizer 160, from Monsanto, wherein a suitable emulsifier is polyoxyethylene sorbitan monolaurate available from ICI America, Inc. under the trade designation Tween ® 21 emulsifier. Another example of a suitable poasticizer is tri-xylyl phosphate available under the trade designation Phosflex 179 ®-A available from Stauffer Chemical Company. This material is a liquid with a specific gravity at 20-°C./20-°C. of 1.143, a density of pounds per gallon of 9.5, a boiling point in degrees C. at 10 millimeters of mercury of 265°–285° C., a pour point of 0° F., a viscosity at 100° F., SUS of 220 and a flashpoint of 455° F.

Another suitable plasticizer is Benzoflex dibenzoate esters of dipropylene glycol or any of several polyethylene glycols available from Velsicol Chemical Corporation. Another optional component that may be present in the coating composition is a flame retardant, where any flame retardant that is water soluble, emulsifiable or dispersible can be used. A suitable flame retardant is antimony trioxide which can be emulsified with the Tween 21 emulsifier in water. Generally, the amount of the softening agent employed in the formulation depends on the rigidity of the polyurethane film. The amount can range from zero to an amount of about 30 weight percent of the solids that would make even the most rigid polyurethane soft for impregnating and coating the bundles of fibers.

In addition to the aqueous disperisble, emulsifiable or soluble polyurethane and crosslinking material present in the aqueous impregnating coating composition along with water, there may also be present a number of optional components. The type of optional component present depends upon the final end use of the coated bundle of fibers. For instance, where the coated bundle is to be braided and woven for producing electrical harnesses to contain electrical wires, a lubricant should be present in the aqueous coating composition. Any glass fiber lubricant known to those skilled in the art can be incorporated into the aqueous coating composition. A particularly suitable lubricant is a silylated lubricant available from Union Carbide Corporation under the trade designation Y-9662. This material as described in the Product Safety Data Sheet is an organosilane ester with a boiling point of greater that 150° C. at 760 mm Hg and with a specific gravity of 1.05 at 25°/25° C., and with a vapor density of greater than one, and with a vapor pressure at 20° C. of less than 1 mm Hg and with less than 1 percent volatiles by volume, and with an evaporation rate of less than 1 with butyl acetate equal to one and with an appearance of a clear to slightly hazy colored liquid and with a characteristic odor. Another additional ingredient that can be present in the aqueous coating composition is a silane coupling agent and any of the aforelisted silane coupling agents used in the aqueous sizing composition can be used in the aqueous coating composition.

A suitable flame retardant, which may assist in curing the polyurethane, like an aqueous dispersion of a brominated epoxy polymer, is an optional material that may be present in the composition. A suitable example is the brominated epoxy resin dispersion available from Celanese Corporation under the trade designation RDX-49630. This material is a 60 percent dispersion of a brominated epoxy resin in water, where the epoxy resin contains approximately 20 percent by weight bromine without any organic solvents being present. The viscosity of this material at 25° C. is 10,000 centipoise with a weight per gallon of 10.1 and a weight per epoxide of 450 and a pH of 7.2. When this epoxy resin is used in the aqueous impregnating coating composition, it can be cured with curing agents such as dicyandiamide, various substituted imidazoles and aliphatic amines. A suitable curing agent is that available form Celanese Corporation under the trade designation Epicure 8525 polyamine curing agent. This latter material has a viscosity of 800 centipoise at 75° C. and an equivalent weight on solids of 127 and pounds per gallon of 8.1.

The aqueous impregnating coating composition can be prepared by adding all of the components sequentially or simultaneously to the desired volume of water with appropriate emulsifiers for any of the material to be emulsified or dispersed in water. Preferably, the materials that are not water soluble are preemulsified or dispersed with suitable solvents and emulsifiers with appropriate HLB values as known to those skilled in the art and then added to formulate the aqueous coating composition. Most preferably, the aqueous dispersion of the polyurethane polymer has added to it any aqueous dispersed plasticizers and aqueous dispersed waxes and lubricants, fire retardants and the like. The crosslinking material which is in a dilute aqueous medium is added to the polyurethane polymer dispersion or mixture of polyurethane and any plasticizers, lubricants and/or fire retardants. The aqueous coating can be further diluted with water to achieve a desired volume of material to give the aqueous coating composition the total solids and viscosity required for impregnating the bundles of filaments.

The aqueous impregnating composition is applied to the bundles of filaments which includes strands, bundles of strands, yarns twisted and untwisted and merely bundles of monofilaments. The application can be by dip coating or die coating or any other process known to those skilled in the art for applying coatings to groups of filaments. For example, the bundle of filaments can be dipped into a bath containing the aqueous impregnating composition or the bundle can contact a kiss-roll or other applicator device that carries it to contact the bundle of filaments. Also a die coating arrangement can be employed, where the bundle of filaments is pulled, pushed or stuffed through permanent or adjustable orifices. This operates effectively to open the strand immediately in advance of the orifice to expose the innermost regions of the glass fiber bundle to the liquid impregnant located in the container with the orifices. Before the bundle contacts the impregnant, it can ride over a bar or similar device under tension to spread the fibers in the bundle for maximum separation and better impregnation. The sized filaments have the sizing composition which does not provide too much integrity between the filaments when they are gathered into groups or bundles of filaments so that upon the application of a disruptive force, before or during dip or die coating, the filaments separate somewhat one from the other to assist in allowing the coating composition to surround and enter the groups or bundles of filaments. Hence, the sizing assists in producing an impregnation preferably to a degree so that every filament in the bundle or in bundled strands has a substantial portion of its surface covered with the aqueous coating composition so that when the aqueous coating composition is dried and partially cured, the filaments in the bundles will be separated from each other.

The bundles of filaments with the treatment of the aqueous coating composition are dried to partially cure and reduce the moisture content of the aqueous coating composition. Any method known to those skilled in the art for curing crosslinkable polymeric materials may be used to dry and cure the coated and impregnated bundle of filaments. It is preferred that the drying is a non-dielectric type of drying and that the moisture is reduced to a moisture content in the range of less than around 1 to about 2 percent of the bundles. This and partial curing are accomplished by drying at suitable temperatures and times to result in the desired moisture reduction and partial cure. Preferably, the drying is conducted at a temperature in the range of about 400° F. to about 500° F. (200°–260° C.) for a time in the range of about 10 seconds to about 60 seconds or any equivalent temperature and time relationship to accomplish a similar degree of moisture reduction and partial cure.

The partially cured impregnated and coated bundle of filaments is flexible enough to undergo myriad processes for producing fiber reinforced polymers and fabrics. A nonexclusive example of utilization in the fiber reinforced polymer area is the production of reinforcement cable for telephone drop wires and reinforcement for fiber optic cables. The coated and impregnated bundles of glass fibers can be combine with the matrix polymer by any method known to those skilled in the art, like melt extrusion of the matrix resin into a die with the bundles of glass fibers. The bundles for reinforcing fiber optic cable is comprised of zero twist glass fibers. Nonexclusive examples of fabric producing processes include weaving, nonwoven fabrics, knotted, knitted, braided, weft-knit fabric machine. On this type of machine, the fabric is a bi-directional crosslaid warp and weft structure, where the weft yarns do not interlace as in traditional woven fabrics. A "knit stitch" is run in the warp machine direction to lock the fabric together. For the weaving operation, plain weave, satin weave or any other type of weaving for producing a fabric as known to those skilled in the art can be used.

The impregnated, coated bundles and fabrics, whether woven or nonwoven or knitted or braided can be used with numerous types of matrix polymers or can be coated with numerous types of coatings by myriad processes or remain uncoated. Examples of suitable polymeric coatings include: vinyl resins such as polyvinyl chloride, polyethylene and ethylene copolymers, polyurethanes, phenolic resins, melamine formaldehyde resins and elastomeric materials such as chlorosulfonated polyethylene, chlorinated polyethylene, and polymers of ethylene propylene diene monomers, and Hypalon ® elastomers and silicone polymers.

These types of polymers can be coated onto fabrics of the flexible bundle of filaments by impregnation or saturation processes and surface coating processes such as solvent-containing coatings and 100 percent solids coatings and lamination processes of preformed films or sheets. For example, when a plastisol, 100 percent solids coating, is used, an application of a first coating of poly(vinyl chloride) latex is applied to the fabric to improve adhesion of subsequent plastisol coatings. After the application of the plastisol coating paste to the fabric, the fabric is heated to a termperature usually around 350° to 400° F. (177°–205° C.) to permit the resin particles to form a continous phase over the fabric and to actually contact in the interstices between the fabric. The polymeric coating then cools to a tough, coherent film at room temperature. The fusion process is so quick that the coated fabrics may be cooled as soon as the required fusion temperature is obtained. In addition to the polymeric material, various pigments or fillers can be included and the polymeric materials may be modified by plasticizers and solvents.

The polymeric coating and perferably the polyvinyl chloride coating also can be applied by any impregnation process known to those skilled in the art such as passing the fabric over a knife-over-roll coater. Also any wet coating process known to those skilled in the art can be used such as passing the fabric over sequential knife coaters or through a floating knife coater with a support channel. Also blanket knife coaters and inverted knife coaters and levelon coaters with reverse smoothing rolls can be used as can engraved-roll or rotogravure coating units. In applying the plastisols, any dry or 100 percent solids coating process known to those skilled in the art can be used. For instance, hot melt coating can be used or any modified wet coating process, where there is not any solvent evaporation. In addition, cast-coating techniques can be used as well as metal-belt precast coaters. Also a dry powder resin coating method such as hot calendar-coating and extrusion-coating can be used. Also wet lamination and dry lamination involving the union of the fabric with a film or sheet of the polymer, which has been formed in a separate operation, can be used. In the lamination process, the film or sheet can be formed by calendaring, by extrusion, or by casting in a separate operation and laminated to the fabric base. With these processes an adhesive coating can be applied to the plastic sheet prior to the application of pressure against the fabric and plastic sheet or the plastic sheet can act as the thermoplastic adhesive itself and it can be heated to produce the adhesion and, afterwards, brought into contact with the fabric while hot. The use of the adhesive application is performed in the multiple-ply drum lamination process. Also with foamable polymeric materials, the thermoplastic foam lamination process can be used.

In addition to the woven or knitted fabrics or nonwoven scrim end use application, numerous specialty products can be produced from the impregnated bundles of fibers of the present invention. Such specialty Products includes ropes and cordage, dryer felts, conveyor belts, reinforcement mesh for concrete and gypsum, webbing and strapping, conveyor slings, electrical sleeving and harnesses and reinforced tapes, cables for aerial dropwires, mattress ticking and fiber optic cables. In most of these specialty product areas, the aqueous coating composition would have a lubricant present and preferably a silylated lubricant for facile braiding and weaving of the resultant coated bundle of glass fibers. Also the impregnated bundles of filaments are readily receptive to both aqueous and nonaqueous dying processes.

FIG. 1 depicts a coated fabric of the present invention, where numeral 12 shows the fabric comprised of the flexible impregnated bundle of glass fibers of the present invention and numerals 11 and 13 indicate the polyvinyl chloride sheets or films that are laminated together sandwiching the fabric in between the laminate sheets. Ordinarily, the thickness of the coated fabric ranges from even less than 0.01 to greater than 0.06 inch (0.025 cm–0.15 cm), and the amount of coating on a unit area of the fabric varies widely, but it is usually around 5 to around 50 ounce/yd$^2$ (119–1700 gm/m$^2$).

Figure 2:
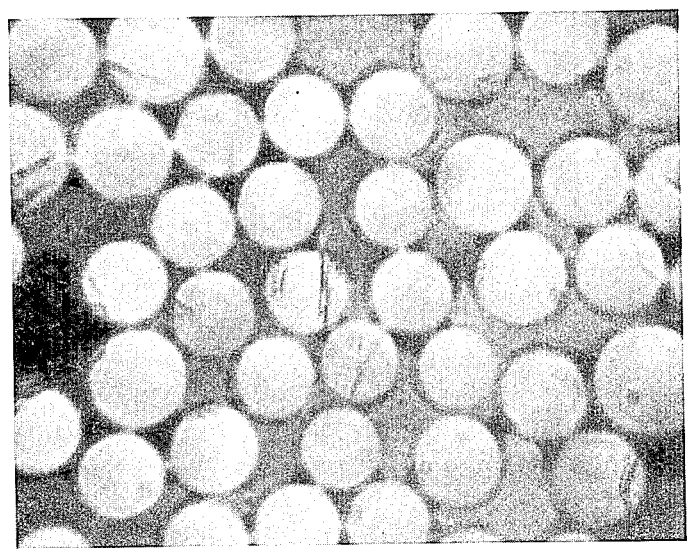
FIG. 2 is a photograph of a microscopic, enlarged cross-section of the impregnated bundle of treated glass fibers.

FIG. 2 is a photograph depicting a cross-sectional view of the coated bundle of glass fibers of the present invention. The cross-section is magnified 600 times on a conventional microscope. The specimen was prepared by making a 0.01 mil cross-sectional cut with a microtone cutter of the pigmented impregnated bundle of glass fliaments of the present invention. The specimen was embedded in epoxy resin. Numeral 14 shows the glass filaments with the residue of the sizing composition and numeral 15 depicts the partially-cured, moisture-reduced coating impregnating the bundle of sized glass fibers. As noted from FIG. 2, the majority of glass filaments are not actually touching each other with a glass surface to a glass surface, but are separated from one another by a partially-cured, moisture-reduced coating.

PREFERRED EMBODIMENT OF THE INVENTION

In the preferred embodiment of the present invention, the filaments of glass fibers are usually of the "E-glass" or "621-glass" variety. The glass fibers are formed by attenuation from molten streams of glass issuing forth from orifices in a bushing of a glass batch melting furnace. After the filaments have cooled below the boiling point of water, an aqueous sizing composition is appied to the fibers. The aqueous sizing composition is a nonstarch textile size having a 50/50 blend of polyalkylene polyol available under the trade designation Pluracol ® V-7 polyol and polyoxyalkylene polyol available under the trade designation Pluracol ® V-10 polyol from BASF Wyandotte. The amount of the blend is in the range of about 0.5 to about 5 weight percent of the aqueous treating composition and most preferably, about 1 to about 3 weight percent. A silane coupling agent is preferably a lubricant modified amino silane coupling agent available under the trade designation Y-9072 or standard product A-1108 silane from Union Carbide Corporation. This material is present in an amount in the range of about 0.01 to about 2 weight percent of the aqueous treating composition. The preferred cationic lubricant that is present in the aqueous size is a polyamine lubricant commercially available as an acidified cationic fatty acid amide under the trade designation Emery 6760-U. This material is present in the aqueous treating composition in an amount of about 0.1 to about 4 weight percent of the aqueous treating composition. Total solids of the aqueous treating composition can be a convenient solids range for sizing compositions to be applied at a proper and desired LOI to glass fibers. Preferably, the total solids is in the range of about 3 to about 20 weight percent. It is preferred to apply the aqueous treating composition to the glass fibers in such a manner to give an LOI for the glass fibers in the range of about 0.1 to about 1 percent and most preferably, about 0.5 to about 0.8 percent.

The exact components of the aqueous impregnating coating composition to be applied to the glass fibers treated with the aqueous nonstarch sizing composition depends upon the end use of the coated glass fibers, but the impregnating composition preferably is a one phase polymeric system. When the coated glass fibers are used in cable applications like support cables for fiber optics, the aqueous coating composition has the following formulation:

| | |
|---|---|
| Aqueous dispersion of polyurethane polymer (Witco 290-H) | 1207 grams |
| Water | 1034 grams |
| Butyl benzyl phthalate (Sanitizer 160) | 138 grams |
| Polyoxyethylene sorbitan monolaurate (Tween 21 from ICI America, Inc.) | 17 grams |
| Hot Water | 345 grams |
| Water | 2586 grams |

| | |
|---|---|
| Aqueous dispersion of polyurethane polymer (Mobay XW 110) | 344 grams |
| Aqueous epoxy dispersion (Witco XW) as crosslinking material | 94 grams |

The aqueous coating composition was prepared by combining deionized water and the polyurethane 290-H dispersion to a premix tank and stirring for 10 minutes. All of the valves of a main mix tank were closed and an agitator was started and the diluted aqueous dispersion of polyurethane was introduced into the main mix tank. The plasticizer was emulsified in a premix tank with an Eppenbach mixer by adding the plasticizer and the emulsifier and starting the Eppenbach and adding hot deionized water at a rate of 1 to 2 grams per minute until the emulsion was inverted. When inversion was complete, the water addition rate was increased until all of the specified water is added. The emulsified plasticizer is then added to the main mix tank. Deionized water was added to a premix tank and the aqueous polyurethane dispersion available as XW-110 emulsion from Mobay Chemical Company was added. Also deionized water was added to a premix tank and the aqueous epoxy dispersion was added and the mixture was stirred for around 10 minutes. Sequentially, the diluted mixtures of the aqueous polyurethane and epoxy disperions were added to the main mix tank. The formulation was diluted to a final volume and stirred for around 25 minutes. The aqueous coating composition having a total solids of 30±1 weight percent and a pH of 8.5±0.5 is applied in a kiss-roll coating operation with an applicator roll speed, and line speed of the twisted or untwisted bundle of filaments adjusted to give about 7 to about 12 percent by weight pick up of the impregnant coating. The bundles of filaments are preferably K-15 4/0 bundles. In processing the impregnated coated bundles, it is preferred that oven pulleys and tensioning bars that contact the bundles have a coated surface of Silverstone TM polyfluorocarbon, although Teflon ® coatings could also be used. Impregnated coated bundles are passed through an oven to reduce the moisture content and cure the impregnating coating. The temperature of the oven is in the range of about 490° F. to 530° F. and the line speed is around 200 to 250 feet/min. through the oven.

In alternative embodiments, the K-15 4/0 strand construction need not be the only strand construction used for the coated bundle of glass fibers. For instance, K-15 1/0, 2/0, 3/0, 4/0 and K-37 and K-7.5 1/0 and 2/0 and H-25 1/0 and G-37 1/0 and G-75 1/0 and G-150 1/0 and D-225 1/0 and D-450 1/0 and M-450 are just a few examples of other types of strand constructions that can be used.

When the partially cured, moisture-reduced coated bundle of glass fibers are to be used for braiding and weaving into a fabric for electrical harness or sleeve applications, the aqueous coating composition preferably has the following formulation:

| | |
|---|---|
| Aqueous dispersion of polyurethane (Witco 290-H) | 7000 grams |
| Silylated lubricant (Y-9662) | 100 grams |
| Cold water | 5000 grams |
| Trixylyl phosphate (Phosflex 179A) | 700 grams |
| Butyl benzyl phthalate plasticizer (Sanitizer 160) | 600 grams |
| Poloxyethylene sorbitan monolaurate (Tween 21) | 100 grams |
| Water (warm, distilled) | 500 grams |
| Melamine formaldehyde resin (Resimene 841) | 400 grams |
| Water (distilled) | 600 grams |
| Solution of toluene sulfonic acid and isopropanol 40% acid and 60% alcohol (Cycat 4040) | 10 grams |
| Aqueous dispersion of brominated epoxy polymer (RDX 6315) | 840 grams |
| Water | 800 grams |
| Polyamine epoxy curing agent (Epicure 8525) | 30 grams |
| Antimony trioxide flame retardant | 200 grams |
| Water | 800 grams |

In a main mix tank the aqueous polyurethane dispersion was added along with the silylated lubricant and cold distilled water with agitation. In a premix tank, the mixture of plasticizers was emulsified with warm distilled water and this mixture was added to the main mix tank. In a premix tank the malamine formaldehyde was combined with the acid catalyst and water and this mixture was added to the main mix tank. In another premix tank, the aqueous dispersion of brominated epoxy polymer was combined with the polyamine curing agent and water and this mixture was added to the main mix tank. The flame retardant was combined with water in a premix tank and added to the main mix tank. The total solids of the formulation was 18 percent and the total volume was 9 gallons. This aqueous coating formulation was applied to the aforementioned sized glass fibers in a similar manner as that of the aqueous coating formulation of the preferred embodiment.

The following examples further illustrate the embodiments of the present invention and should not be construed as limiting the present invention which is properly delineated in the claims.

Table 1 presents 9 examples of an aqueous coating formulations in accordance with the present invention. These aqueous coating formulations, all of which had viscosities in the range of 4-5 centipoise, were applied to sized glass fibers having the sizing composition of the preferred embodiment in the same manner as for the preferred embodiment. The formulations of Example 1 can be used for impregnated yarns that are prepared into fabric and coated with polymeric material to produce a coated fabric. This formulation was prepared by adding the deionized water for the polyurethane dispersion to a premix tank and adding the polyurethane dispersion. This combination was stirred for 10 minutes and transferred to a main mix tank. The plasticizer was emulsified in the same manner as described for the acid formulation shwon on page 25. The melamine formaldehyde and water and acid catalyst were added in a similar manner as described for the formulation of pages 26 and 27. As the last ingredient, the silylated lubricant was mixed with deionized water in a premix tank and added to the main mix tank.

TABLE 1

Impregnant Coating Formulations

| | 1 Kgs/Wt % Solids/ Wt % Aqueous | 2 Gm/Wt % Solids/ Wt % Aqueous | 3 Gm/Wt % Solids/ Wt % Aqueous | 4 Gm/Wt % Solids/ Wt % Aqueous | 5 Gm/Wt % Solids/ Wt % Aqueous | 6 Gm/Wt % Solids/ Wt % Aqueous |
|---|---|---|---|---|---|---|
| Polyurethane dispersion Witco 290H (65% solids) | 329.4/69.4/14 | 1207/71.3/15.9 | 7000/157.2/13.3 | 1207/79/15.9 | 1207/82/15.9 | 1207/80/13 |
| Water (deionized) | 454.2 L | 1034 | 5000 | 1034 | 1034 | 1034 |
| Butyl benzyl phthalate plasticizer (Sanitizer 160) | 37.65/12.2/2.5 | 138/12.5/2.8 | 800/10/2.3 | — | — | 138/14/2.3 |
| Trixyly phosphate (Phosflex 179A) | — | — | 700/8.8/2 | — | — | — |
| Polyoxyethylene sorbitan monolaurate (Tween 21) | 4.7/1.5/.3 | 17/1.5/.3 | 50/.6/.1 | — | — | 17/1.7/.3 |
| Water (warm) | 106 L | 345 | 1000 | — | — | 345 |
| Melamine formaldehyde resin Resimene 841 | 47.1/15.3/3.1 | — | 1000/12.6/2.9 | 172/17.3/3.5 | 172/18/3.5 | — |
| Melamine formaldehyde resin Resimene 970 | — | — | 500/6.3/1.5 | — | — | — |
| Water | 151 L | — | 2000 | 517 | 517 | 517 |
| Acid catalyst (Cycat 4040) | .094/.03/.003 | — | 30/.2/.03 | 0.3/.03 | 0.3/.03/— | — |
| Solution of toluene sulfonic acid in isopropanol (40% acid/60% OH) | — | — | — | — | — | — |
| Acetic acid | — | — | — | 5.5 ml | — | — |
| Organosilane ester lubricant Y-9662 | 4.7/1.5/.3 | — | 100/1.3/.3 | — | — | — |
| Gamma-methacryloxypropyltrimethoxy silane (A-174) | — | — | — | — | — | — |
| Polyurethane resin dispersion (Mobay XW-110) 33% | — | 345/10.3/2.3 | — | 55/3.9/.78 | — | — |
| Epoxy resin aqueous dispersion (Witcobond XW) 50% | — | 94/4.3/1 | 200/1.3/.3 | — | — | 94/4.6/.8 |
| Antimony trioxide fire retardant | — | — | 100/1.3/.3 | — | — | — |
| Water | — | — | 1000 | — | — | — |
| Polyoxyethylene sorbitan monolaurate (Tween 21) | — | — | 50/.63/.1 | — | — | — |
| Water to desired volume of | 1514.16 L (400 Gal) | 5 L | 20 L | 3 L | 5 L | 6 L |
| Solids % | 19 | 20 | 23.3 | 20 | — | 16 |
| pH | 8.5 | 8-8.5 | 8-8.5 | 8-8.5 | 8-8.5 | 8-8.5 |

Examples

| | 7 Gm/Wt % Solids/ Wt % Aqueous | 8 Gm/Wt % Solids/ Wt % Aqueous | 9 Gm/Wt % Solids/ Wt % Aqueous |
|---|---|---|---|
| Polyurethane dispersion Witco 290H (65% solids) | 1207/77.3/13 | 1207/69.8/13 | 1207/80/13 |
| Water (deionized) | 1034 | 1034 | 1034 |
| Butyl benzyl phthalate plasticizer (Sanitizer 160) | 138/13.6/2.3 | 275/24.5/4.51 | 138/14/2.3 |
| Trixyly phosphate (Phosflex 179A) | — | — | — |
| Polyoxyethylene sorbitan monolaurate (Tween 21) | 17/1.7/.3 | 17/8.5/.3 | 17/1.7/.3 |
| Water (warm) | 345 | 345 | 345 |
| Melamine formaldehyde resin Resimene 841 | — | — | 43/4.4/.7 |
| Melamine formaldehyde resin Resimene 970 | — | — | — |
| Water | 517 | 517 | 517 |
| Acid catalyst (Cycat 4040) | — | — | — |
| Solution of toluene sulfonic acid in isopropanol (40% acid/60% OH) | — | — | — |
| Acetic acid | — | — | — |
| Organosilane ester lubricant Y-9662 | — | — | — |
| Gamma-methacryloxypropyltrimethoxy silane (A-174) | — | — | — |
| Polyurethane resin dispersion (Mobay XW-110) 33% | 86/2.8/.5 | — | — |
| Epoxy resin aqueous dispersion (Witcobond XW) 50% | 94/4.6/.8 | 94/4.2/.8 | — |
| Antimony trioxide fire retardant | — | — | — |
| Water | — | — | — |

TABLE 1-continued

| Impregnant Coating Formulations | | | |
|---|---|---|---|
| Polyoxyethylene sorbitan monolaurate (Tween 21) | 6 L | 6 L | 6 L |
| Water to desired volume of | | | |
| Solids % | 16 | 18.5 | 16.2 |
| pH | 8–8.5 | 8–8.5 | 8–8.5 |

Table 2 presents performance data for both impregnated and unimpregnated and uncoated bundles of glass filaments. The filaments for both varieties of bundles were sized with the aqueous sizing composition of the preferred embodiment. The unimpregnated and uncoated bundles were not treated with the aqueous impregnating coating used in the present invention. The impregnated bundles of sized glass fibers were impregnated with the polyurethane impregnants of Examples 1 and 6-9 in Table 1. The performance data of Table 2 are for the impregnated bundles of glass fibers under the first section entitled, "Performance of Impregnated Bundles of Glass Filaments"; and for fabric properties of fabrics woven with the impregnated bundles of fibers under the second section entitled "Physical Properties of Fabric Made from Bundles of 10×10 Plain Weave". The tests conducted in Tables 2, 3 and 4 were all conducted in accordance with standard test procedure for these tests as follows:

| Test | Procedure |
|---|---|
| Impregnated bundle strength including: tensile, Young's modulus, and failure elongation | American Society of Testing Materials (ASTM) test D-2970 |
| Flex life | ASTM-D-2176 with 0.5 lb (226.8 gm) load |
| Fabric breaking strength | ASTM-D-1682 |
| Fabric torque tear test | ASTM-D-2262 |
| Fabric MIT Flex life | ASTM-D-2176 with 0.5 lb (226.8 gm) load per end |
| Shore Hardness | Shore durometer by standard procedures |
| Stoll flex test | ASTM-D-1175 with 15 ends per specimen |
| Elongation | ASTM-D412 |

The crease tensile test involves folding a fabric of the impregnated and unimpregnated and uncoated bundle of filaments on itself perpendicular to the warp direction and placing a 10 lb (4.54 Kg) weight on the crease for 18 hours. The tensile strength of the creased fabric is tested according to ASTM-D-1682.

TABLE 2

PERFORMANCE OF IMPREGNATED BUNDLES OF GLASS FILAMENTS

Physical Properties of Bundles

| Samples | Tensile Strength psi/gm per denier | Young's Modulus (psi) | Failure Elongation (%) | Flex Life (cycles) |
|---|---|---|---|---|
| Sized, uncoated, unimpregnated bundles K-15 1/0 | $1.6 \times 10^5/6.0$ | $7.8 \times 10^6$ | 3.5 | 100 |
| Impregnated K-15 1/0 Ex. 1 Table 1 | $3.1 \times 10^5/9.8$ | $7.8 \times 10^6$ | 4.5 | 2200 |
| Impregnated K-15 1/0 Ex. 6 Table 1 | — | — | — | 2920 |
| Impregnated K-15 1/0 Ex. 7 Table 1 | — | — | — | 1355 |
| Impregnated K-15 1/0 Ex. 8 Table 1 | — | — | — | 2609 |
| Impregnated K-15 1/0 Ex. 9 Table 1 | — | — | — | 2010 |

Physical Properties of Fabric Made from Bundles of 10 × 10 Plain Weave

| | Denier | Wt. Oz/yd² | Breaking Strength lb/15 ends | Tongue Tear lb/3" wide Sample | Stoll Flex Abrasion (cycles) | MIT Flex Life (cycles) | Crease Tensile Strength lb/15 ends |
|---|---|---|---|---|---|---|---|
| Sized uncoated, unimpregnated bundles K-15 1/0 | 3000 | 7.8 | 532 | 8 | 316 | 430 | — |
| Impregnated K-15 2200 1/0 Ex. 1 Table 1 | 3250 | 8.5 | 716 | 36 | 2000 | 4200 | 566 |

Table 2 shows the improvement of the impregnated bundle of filaments in strength, flexibility and abrasion resistance for application in numerous end uses. The abrasion resistance is shown in the crease tensile test where under the severe bending conditions of this test, the fabric of the impregnated yarn retained around 60 percent of its original tensile strength.

Also the impregnated bundle of filaments showed good receptivity to dyes.

A 10×10 plain weave fabric of the impregnated bundles of Example 1 was immersed in an aqueous dye bath containing 3.3 gm/liter of dye. The fabric was stirred in the bath for around 2 minutes and removed and rinsed in both running hot water and running cold water. The fabric was scoured in a water bath containing Triton-X-100 octylphenoxypolyethoxyethanol. Subsequently, the fabric was rinsed in both running hot water and running cold water.

This procedure was performed twice on separate similar fabric samples. One procedure was conducted with the basic dyestuff, Remacryl Red FGL from American Hoechst Corporation. The second procedure was conducted with the acid dyestuff, Lanteryl Bleu B, also from American Hoechst Corporation. Both procedures produced well dyed fabrics.

Table 3 presents data on impregnated coated yarns, where the aqueous impregnating coating composition of examples 2 and 7 of Table 1 were used along with two additional aqueous impregnating coating formulations. The yarn properties show the effect of increasing the amount of the polyurethane with a lower film elongation percentage in the polyurethane combination in the aqueous impregnating coating composition. These formulations were prepared and applied to the bundles of glass fibers and cured in a similar manner like that of the preferred embodiment.

TABLE 3

Formulation and Comparative Properties of Blended Urethane Impregnated Yarns

| Ingredient (1.6 Gal., 25% Solids) | Eg 7 Gm/Wt % Solids | Eg 10 Gm/Wt % Solids | Eg 2 Gm/Wt % Solids | Eg 11 Gm/Wt % Solids |
|---|---|---|---|---|
| Witcobond 290-H dispersion | 1207/76 | 1207/74 | 1207/69.7 | 1207/64 |
| Water | 1034/— | 1034/— | 1034/— | 1034/— |
| Sanitizer 160 | 138/13.4 | 138/13 | 138/13.3 | 138/11.2 |
| Tween 21 | 17/1.7 | 17/1.6 | 17/1.6 | 17/1.4 |
| Water | 345/— | 345/— | 345/— | 345/— |
| Mobay XW-110 dispersion | 86/2.8 | 172/5.4 | 344/10.9 | 688/18.4 |
| Witco XW dispersion | 94/4.6 | 94/4.4 | 94/4.5 | 94/3.8 |
| Yarn Properties | | | | |
| Yarn Construction | K-15 4/0 | K-15 4/0 | K-15 4/0 | K-15 4/0 |
| Twist Level | Zero | Zero | Zero | Zero |
| Average Breaking Strength, lbs. | 226 | 235 | 244 | 246 |
| Average MIT Flex Life (No. of Cycles to Failure/ 2 lb load) | 6606 | 8295 | 5035 | 4474 |
| Load at 1% Strain, lbs. | 80 | 90 | 90 | 85 |

Numerous tests were conducted on films of several of the formulations of the examples. These films were cast by evaporating water from a 25 weight percent dispersion in water of the various formulations over 24 hours at room temperature and curing the films in a forced air oven at 410° F. for 2 minutes.

The results are given in Table 4 as follows:

TABLE 4

| | Eg 2 | Eg 7 | Eg 10 | Eg 11 | Eg 12a | Eg 13b |
|---|---|---|---|---|---|---|
| Breaking Strength (psi) | 1271 | 899 | 806 | 1011 | 1655 | 630 |
| Avg. Elongation at Break (percent) | 374 | 397 | 288 | 338 | 324 | 421 |
| Avg. Young's Modulus of Initial Film (psi) (Calculated in accordance with ASTM D-638) | 468 | 340 | 947 | 542 | 939.6 | 196 |
| Shore A Hardness | 75–80 | 70–75 | 70–75 | 75–80 | 75–80 | 65–70 |
| Mean Film Thickness (inch) | 0.018 | 0.020 | 0.022 | 0.025 | 0.022 | 0.027 |

(a) Example 12 is similar to Example 2 but without the Sanitizer 160 and Tween 21 materials as an emulsified plasticizer or softener.
(b) Example 13 is similar to Example 2 but without crosslinking agent.

Also H-adhesion tests with a 3/8" block where conducted in accordance with ASTM standard D-2138 on several polyvinylchloride reinforced with different impregnated yarns. The difference between the samples was the impregnating and coating formulation present on the glass fibers and the type of polyvinyl chloride, while the other parameters like amount of reinforcement and the like were similar. The results are given in Table 5 as follows:

TABLE 5

Impregnated Fiber Glass Yarns Adhesion Levels in PVC Compounds

| Yarn of Example | Type of PVC-Compound | Shear Adhesion Levels 3/8" Blocks (lbs) |
|---|---|---|
| Control 1 | A | 8.5 |
| Control 2 | A | 4.5 |
| 1 | A | 20.6 |
| 1 | B | 27.7 |
| 7 | A | 25.2 |
| 7 | B | 25.1 |
| 4 | B | 20.5 |
| 5 | B | 42.2 |

Control 1 and Control 2 are yarns impregnated with a non-polyurethane containing polymer.

The better adhesion performance for polyurethane yarns versus non-polyurethane yarns for polyvinylchloride polymeric matrices is shown in Table 5.

We claim:

1. A flexible bundle of high modulus, low elongation fibers, comprising:
    (a) a plurality of fibers constituting a bundle wherein the fibers have a moisture-reduced residue of an aqueous chemical sizing composition having at least a fiber protectorant,
    (b) a moisture-reduced, and at least partially-cured residue that has a film hardness in the range of Shore values from A-10 to D-80 and film elongation of about 75 to about 1000 percent impregnating the bundle of the plurality of fibers where the residue resulted from the aqueous impregnating coating composition has:
        (1) one or more elastomeric, curable polyurethanes selected from the group consisting of water soluble, emulsifiable or dispersible, internally softened polyurethanes, internally plasticized polyurethanes and unplasticized and unsoftened polyurethanes,
        (2) one or more non-sulfur vulcanizing crosslinking materials that are water soluble, emulsifiable or dispersible in an effective amount to at least partially cure the polyurethane,
        (3) when the unsoftened and unplasticized polyurethane is used, at least one softening agent selected from the group consisting of external softening agents and external plasticizers that are water soluble, dispersible or emulsifiable, and
        (4) water in an effective amount to provide an impregnating coating composition for the bundles of glass fibers.
2. Flexible bundle of fibers of claim 1, wherein in the aqueous chemical sizing composition there is present an antistatic agent.

3. Flexible bundles of claim 1, wherein the one or more elastomeric polyurethanes is a blend of at least two aqueous soluble, emulsifiable or dispersible polyurethanes having film properties with different modulus at the same percentage of elongation.

4. Flexible bundles of claim 1, wherein the aqueous impregnating coating composition includes at least one polyurethane that results in a film percent elongation of less than around 700 percent and has one or more water soluble, emulsifiable or dispersible plasticizers is an effective amount.

5. Flexible bundles of claim 1, wherein the aqueous impregnating coating composition includes one or more silane coupling agents.

6. Flexible bundle of claim 1, wherein the polyurethane is cured with up to about 10 weight percent of crosslinking agent on a relative weight percent basis with the polyurethane.

7. Flexible bundle of claim 1, wherein the moisture-reduced, partially-cured residue of the impregnating coating composition also encapsulates the bundle of fibers.

8. Flexible bundle of claim 1, wherein the aqueous impregnating coating composition has as the crosslinking material an aqueous soluble, dispersible epoxy resin in an effective amount for partial curing of the curable polyurethane resin.

9. Flexible bundle of claim 1, wherein the aqueous impregnating coating composition has an aqueous soluble, dispersible or emulsifiable brominated epoxy resin.

10. Flexible bundle of claim 1, wherein the coated bundles are dried at an elevated temperature for a period of time to effect the cure of the impregnant coating in the bundle of fibers.

11. Flexible bundles of claim 1, wherein the residue has a hardness in the range of Shore A 10 to about Shore D 80 and an elongation of about 100 to about 800 percent.

12. Flexible bundle of fibers of claim 1, where the fibers are glass fibers and the aqueous chemical sizing composition has present one or more coupling agents.

13. Flexible bundle of claim 12, wherein the glass fibers are sized with an aqueous chemical sizing composition which is a non-starch-containing composition having about 0.5 to about 5 weight percent of one or more water dispersible, high molecular weight polyols selected from the group consisting of polyoxyalkylene polyols and polyalkylene polyols having an average molecular weight of about 300 to about 12,000 and mixtures thereof present as flexible film formers, and 0.1 to about 2 weight percent of one or more silane coupling agents, and about 0.1 to about 4 weight percent of a cationic lubricant, and water in an amount to give a total solids content for the aqueous composition in the range of about 3 to about 20 weight percent.

14. Flexible bundle of glass fibers of claim 12, where in the aqueous impregnating coating composition there is present a glass fiber lubricant.

15. Flexible bundle of glass fibers of claim 14, wherein the glass fiber lubricant is a silylated lubricant.

16. Flexible bundles of claim 1, wherein the crosslinking material is selected from monomeric or polymeric aldehyde condensate compound, also having an acidic or basic catalyst in an effective amount for partial curing of the curable polyurethane resin.

17. Flexible bundle of claim 16, wherein the aqueous impregnating coating composition has as the aldehyde condensate resin a melamine formaldehyde resin with an acid catalyst.

18. Flexible bundle of claim 1, wherein the aqueous impregnating coating composition has a water soluble, emulsifiable or dispersible fire retardant.

19. Flexible bundle of claim 18, wherein the fire retardant in the aqueous coating composition is antimony trioxide and a brominecontaining fire retardant.

20. Flexible bundle of claim 1, wherein the polyurethane is a reaction product of an isocyanate monomer selected from the group consisting of polyisocyanate including diisocyanate and a monomer of an organic compound having at least two active hydrogens selected from the group consisting of linear and branched polyester polyol, linear and branched polyether polyol, where the reaction is selected from the group consisting of single-step reaction and two-step-chain extension reaction.

21. Flexible bundle of claim 1, wherein the polyurethane is a polyurethane urea polymer.

22. Flexible bundle of claim 1, wherein the moisture content of the moisture-reduced, partially-cured impregnating coating composition is in the range of less than 1 to around 2 percent of the bundle.

23. Flexible bundle of claim 1, wherein the elastomeric, curable polyurethane is fully reacted without any free isocyanate groups.

24. Flexible bundle of claim 1, wherein the elastomeric polyurethane has film properties of hardness of about 10 Shore A to about 80 Shore D and an elongation on the order of 100 to 800%.

25. Flexible bundle of claim 1, wherein the moisture-reduced residue of an aqueous chemical sizing composition is present in the bundle in an amount in the range of about 0.5 to about 5 weight percent of the treated fibers.

26. Flexible bundle of claim 1, wherein the amount of the moisture-reduced, partially-cured residue of the impregnating coating composition present with the bundle is in the range of greater than around 5 weight percent of the bundle.

27. Flexible bundle of claim 1, wherein the elastomeric curable polyurethane is curable by the addition of monomers selected from the group consisting of diisocyanate, polyols and epoxies, and curable moieties present on chemical compounds selected from the group consisting of hydroxyls, epoxies, ureas, amines, amides, olefinic groups and reactive methylene groups.

28. Flexible bundles of claim 1, wherein the elastomeric curable polyurethane is present in an aqueous emulsion or dispersion through the use of internal or external dispersing agents and emulsifiers.

29. Flexible bundle of fibers of claim 20, wherein the moisture content of the moisture-reduced, partially-cured impregnating composition is in the range of around 2 percent of the bundle.

30. A flexible bundle of glass fibers, comprising:
(a) a plurality of glass fibers constituting a bundle, wherein the fibers have a moisture-reduced, residue of an aqueous non-starch-containing sizing composition having a 50/50 blend of a polyalkylene polyol and a polyoxyalkylene polyol, wherein the polyols have an average molecular weight from about 300 to about 12,000 and wherein the blend is present in an amount of about 0.5 to about 5 weight percent of the aqueous sizing composition, silane coupling agent in an amount of about 0.1 to about 2 weight percent of the aqueous sizing composition, a cationic acidified fatty acid amide polyamine lubricant in an amount of about 0.01 to about 4 weight percent of the aqueous sizing composition, wherein the total solids of the aqueous sizing composition is in the range of about 3 to about 20 weight percent and the amount of the moisture-reduced residue on the glass fiber is in the range of about 0.1 to about 2 percent based on the weight of the sized glass fibers, (b) a moisture-reduced, partially-cured residue that has a film hardness in the range of Shore values from A-10 to D-80 and film elongation of about 100 to about 800 percent impregnating the bundle of the plurality of fibers, where the aqueous impregnating coating composition has
  (1) one or more elastomeric polyurethane polymers that are water soluble, emulsifiable or dispersible, and at least partially curable, where the film elongation of an uncured film of the at least one polyurethane is in the range of about 75 to about 1000,
  (2) one or more non-sulfur vulcanizing crosslinking materials in an effective amount to cure the curable polyurethane polymer to at least retard the redispersibility of the polyurethane polymer in water,
  (3) one or more water soluble, dispersible or emulsifiable plasticizers present in an effective amount when the uncured film of the at least one polyurethane has a film elongation of less than around 700 percent,
  (4) one or more silylated lubricants,
  (5) water in an effective amount to provide an impregnanting coating to impregnate the bundle having a viscosity in the range of up to around 20 centipoise and a total solids in the range of around 1 to around 25.

31. Flexible bundles of claim 30, wherein the crosslinking material is an aldehyde condensate selected from the group consisting of melamine formaldehyde resin, urea formaldehyde resin, phenol formaldehyde resin, resorcinol formaldehyde resin, and also having an acid or basic catalyst.

32. Flexible bundles of glass fibers of claim 30, wherein the aqueous impregnating coating composition includes:
  as the one or more plasticizers a butyl benzyl phthalate plasticizer and a trixylyl phosphate with a polyoxyethylene sorbitan monolaurate emulsifier and water.

33. Flexible bundles of glass fibers of claim 30, wherein the moisture-reduced residue of the impregnating coating composition is fully cured with up to about 10 weight percent of the non-sulfur crosslinking agent on a relative weight percent basis with the polyurethane.

34. Impregnated bundles of glass fibers of claim 30 in the form of a nonwoven fabric.

35. Impregnated bundles of glass fibers of claim 30 in the form of a woven fabric.

36. Fabric of claim 34 coated with polymer.

37. Flexible bundle of claim 30, wherein the moisture content of the moisture-reduced, partially-cured impregnating coating composition is in the range of up to around 2 percent of the bundle.

38. Flexible bundle of glass fibers of claim 30, wherein the elastomeric polymer in the aqueous impregnating coating composition is polyurethane that is a reaction product of an isocyanate monomer selected from the group consisting of polyisocyanate including diisocyanate and a monomer of an organic compound having at least two active hydrogens selected from the group consisting of linear and branched polyester polyol, linear and branched polyester polyol where the reaction is selected from the group consisting of single-step and two-step-chain-extension reaction.

39. Flexible bundles of claim 30, wherein the aqueous impregnating coating composition has a softening agent selected from one or more water soluble, emulsifiable or dispersible plasticizers.

40. Flexible bundles of claim 30, wherein the at least one elastomeric polyurethane comprises a blend of at least two aqueous soluble, emulsifiable or dispersible polyurethanes having film properties with different modulus at the same percentage of elongation.

41. Flexible bundle of claim 30, wherein the aqueous impregnating coating composition has a water soluble, emulsifiable or dispersible fire retardant.

42. Flexible bundle of claim 30, wherein aqueous impregnating coating composition also has a fire retardant selected from the group consisting of antimony trioxide and bromine-containing fire retardants.

43. Flexible bundle of glass fibers of claim 30, wherein the elastomeric, curable polyurethane is fully reacted without any free isocyanate group.

44. Flexible bundle of glass fibers of claim 30, wherein the elastomeric polyurethane has film properties of hardness of about 10 Shore A to about 80 Shore D and an elongation on the order of 100 to 800%.

45. Flexible bundle of claim 30, wherein the aqueous impregnating composition has, as the crosslinking material, an aqueous soluble dispersible epoxy resin in an effective amount for partial curing of the curable polyurethane resin.

46. Flexible bundle of claim 30, wherein the aqueous impregnating coating composition has an aqueous soluble, dispersible or emulsifiable, brominated epoxy resin.

47. Flexible bundle of claim 30, wherein the coated bundles are dried at an elevated temperature for a period of time to effect cure of the impregnant coating in the bundle of fibers.

48. A flexible bundle of glass fibers, comprising:
(a) a plurality of fibers constituting a bundle, wherein the fibers have a moisture-reduced residue of an aqueous chemical sizing composition having a fire protectorant and one or more coupling agents, wherein the residue is present in an amount in the range of about 0.05 to about 5 weight percent of the bundle,
(b) a moisture-reduced residue curable to have a film hardness in the range of Shore values from A-10 to D-80 and a film elongation of about 100 to about 800 percent impregnating the bundle of the plurality of fibers, where the moisture-reduced residue has a moisture content in the range of less than around 1 to about 2 percent of the bundle, and where the amount of the residue present with the bundle is in the range of greater than around 5 weight percent of the bundle, and where the residue results from the aqueous impregnating coating composition having:
  (1) one or more elastomeric, curable polyurethanes selected from the group consisting of water soluble, emulsifiable or dispersible elastomeric curable polyurethanes having a molecular weight in the range of about 10,000 to about 40,000 and having film properties of hardness of about 10

Shore A to about 80 Shore D and film elongation on the order of about 75 to 1000 percent, and where the polyurethane polymers are water soluble, emulsifiable or dispersible by being self emulsifiable from containing ionic groups or hydrophilic polyether segments or being emulsifiable with external emulsifying agents selected from the group consisting of nonionic, cationic anionic, amphoteric, and zwitterionic to match the ionic character of the polyurethane, (2) one or more non-sulfur vulcanizing crosslinking materials selected from the group consisting of water soluble, emulsifiable or dispersible monomeric or polymeric aldehyde condensate compounds along with acidic or basic catalysts or an epoxy polymer in an effective amount of up to 10 weight percent on a relative weight percent basis with the polyurethane to at least partially cure the curable polyurethane resin to produce a resultant film of the residue that has a hardness in the range of shore values from A 10 to about D 80 and an elongation of about 100 to about 800 percent and a modulus at 300 percent elongation of about 500 to about 4,000 psi, (3) one or more softening agents that are water soluble, emulsifiable or dispersible present in an effective amount when the film elongation of the at least one polyurethane is less than around 700 percent, (4) water in an amount to provide an impregnating coating composition for the bundles of glass fibers where the composition has a viscosity of around 5 or less for kiss-roll type coating application and up to around 10 to 20 centipoise at room temperature for die coating application where the polyurethane is used in a preemulsified form having a solids content of around 70 percent or less and where the polyurethane is the predominant constituent of the solids of the aqueous impregnating coating composition.

49. Flexible bundles of claim 1 coated with polyvinyl chloride polymeric coating.

50. Flexible bundles of claim 1, wherein the elastomeric curable polyurethane is a polyurethane-urea polymer selected from reaction products of organic compounds having at least two hydrogens and polyisocyanates including diisocyanates, wherein the organic compounds are selected from the polyols such as polyester polyol or polyether polyol, wherein the polyurethane urea polymer is produced by a single step method or two-step-chain-extension method.

* * * * *

UNITED STATES PATENT AND TRADEMARK OFFICE
CERTIFICATE OF CORRECTION

PATENT NO. : 4,762,751

DATED : August 9, 1988

INVENTOR(S) : Mikhail M. Girgis et al

It is certified that error appears in the above-identified patent and that said Letters Patent is hereby corrected as shown below:

Column 30, line 5, "polyester" should be 'polyether'.

Signed and Sealed this

Fourth Day of April, 1989

Attest:

DONALD J. QUIGG

*Attesting Officer*         *Commissioner of Patents and Trademarks*